Aug. 6, 1940.  S. W. THOMPSON  2,210,642
AIRCRAFT
Filed May 27, 1938   2 Sheets-Sheet 1
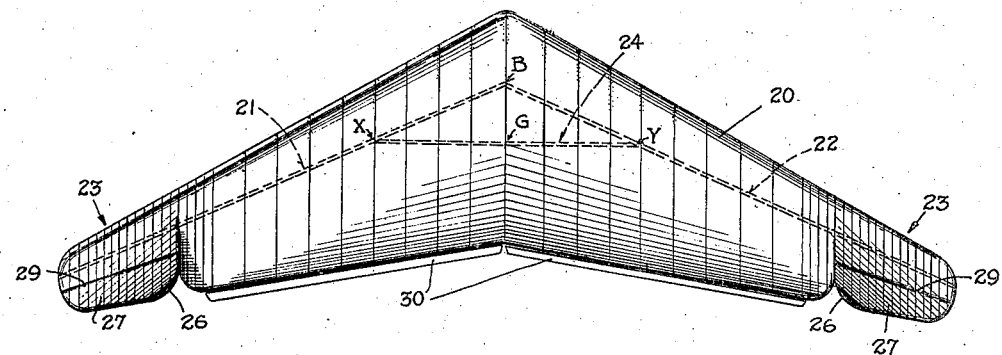
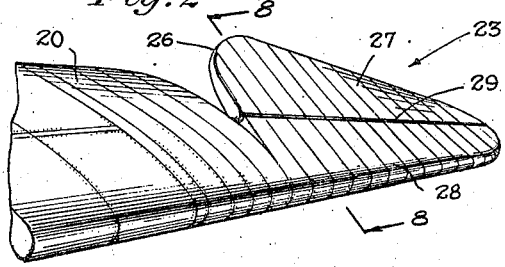
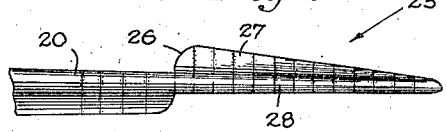
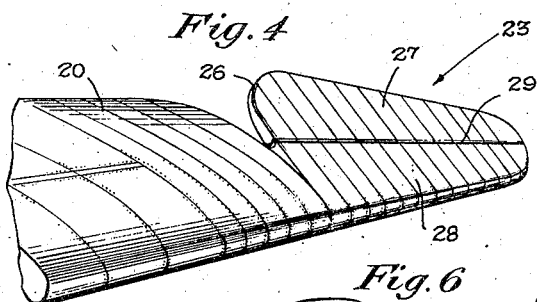
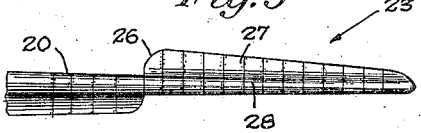
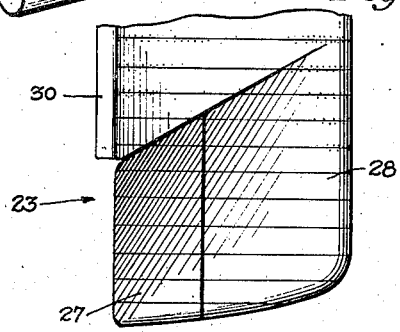
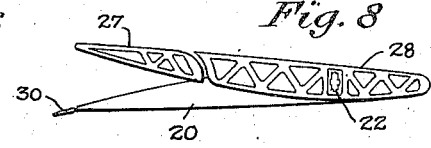
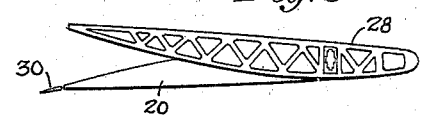
INVENTOR
Stephen W. Thompson,
BY
ATTORNEY

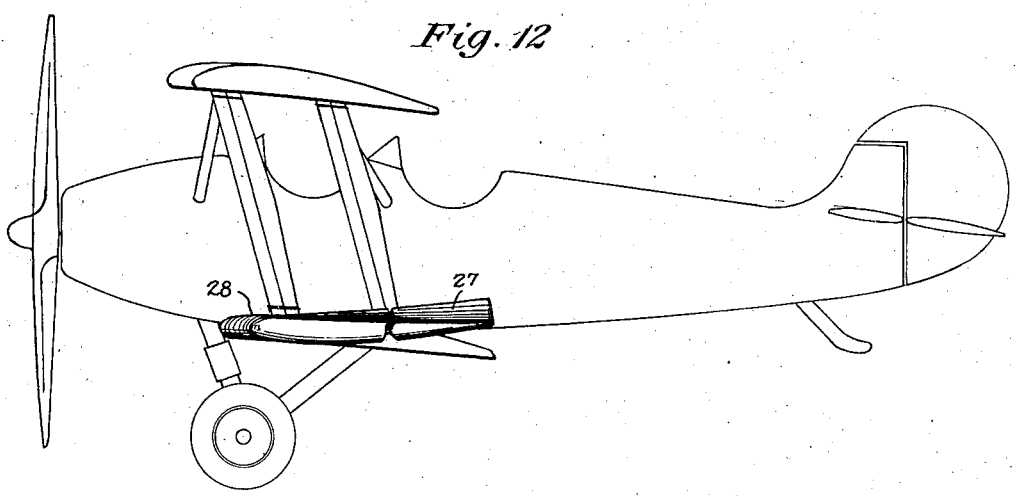
Fig. 12
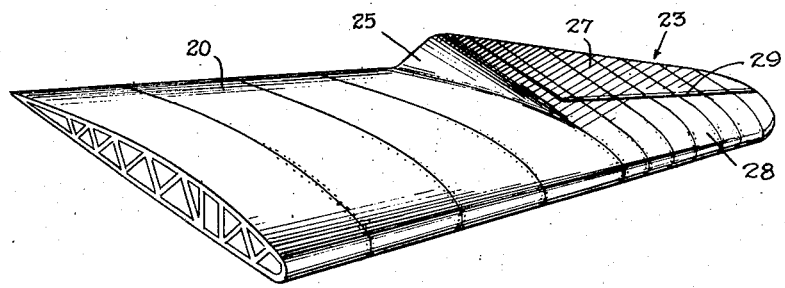
Fig. 10
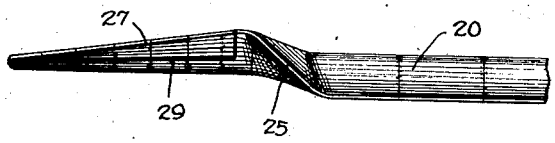
Fig. 11

Patented Aug. 6, 1940

2,210,642

UNITED STATES PATENT OFFICE 2,210,642

AIRCRAFT

Stephen W. Thompson, Dayton, Ohio

Application May 27, 1938, Serial No. 210,405

24 Claims. (Cl. 244—35)

This invention relates to aeronautics, and more particularly, to a wing and stabilizer construction especially useful in connection with the so-called tailless or flying wing type of aircraft, and contemplates, broadly, improvements in the stability, the control, the aerodynamic efficiency, and the strength of a wing of this character.

In the tailless aircraft, as heretofore proposed, the wings have been swept back so that the tips thereof have been behind the center of gravity of the aircraft, the tips being provided with suitable rudders for directional stability. To control the craft in flight, segments of the wing tips have been hinged so that they can be moved together to act as elevators, or moved in opposite directions to function as ailerons.

Longitudinal stability has been obtained generally by gradually decreasing the angle of incidence of the wing from the center section to the wing tips, the center section being at a positive angle while the wing tips are placed at a neutral or negative angle. This washout, although it produces a desired longitudinal stability, results, further, in a very inefficient wing, as each section of the wing in flight is operating at a different angle of attack.

In other instances, longitudinal stability has been obtained by reflexing the trailing edge of the wing, or by reflexing the trailing edge and warping the wing to decrease the angle of incidence toward the tip. Airfoils of this type, however, are comparatively inefficient in flight.

The present invention contemplates a flying wing which will perform with maximum efficiency for a given aspect ratio. This is accomplished by constructing the wing with identical, or basically similar, airfoil sections so that the angle of incidence is substantially the same throughout the span of the wing. This permits the entire wing to be set to the proper angle of attack for the conditions of weight and speed at any given time. The wing constituting the major portion of the total area is devoted only to lifting, and the efficiency thereof is not decreased by its functioning as a stabilizer or as a control surface.

The present invention secures longitudinal stability by providing improved stabilizers at the tips of the wing set at a negative angle of incidence relative to the wing, and concentrates the normal control of the craft in flight in the relationship between the wing and the stabilizers.

This results in a stable wing having a substantially constant lift-coefficient throughout the length thereof, and makes it possible to choose for the wing of a tailless aircraft the most efficient airfoil section available for use on conventional types of aircraft.

According to the present invention, directional stability is provided by the sweepback in the wing and stabilizer combination. This operates as a differential frontal projected area effect between the right and left halves of the wing. The directional stability resulting from this invention is an improvement over that of wings with conventional washout, because the constant angle of incidence throughout the wing provides a greater frontal projected area of the wing at the outer ends of the wing.

A further improvement in the directional stability of a wing of this type is obtained, in accordance with my invention, by disposing the stabilizers in such a manner that, in addition to the negative angle of incidence relation with respect to the wing, there is also a negative dihedral relation between the two stabilizers themselves. Lateral stability is provided as a result of sweepback, as with most tailless aircraft.

To further improve the efficiency of my novel wing arrangement, the stabilizers comprise airfoil sections arranged in an inverted position, that is, the medial line is convex downwardly and concave upward. Such an arrangement provides an optimum lift in the desired downward direction sufficient for stability with a minimum of surface area. The inverted airfoil also increases the strength of the wing structure by providing greater spar depth at the joint between the wing and the stabilizer.

The control of the craft is greatly simplified according to the present invention, and is accomplished by hinging the trailing portions of the stabilizers to act as flaps. These flaps are connected to the controls in the pilot's cockpit by known means, so that they may be moved simultaneously up or down to function as elevators, or they may be moved in opposite directions to function as ailerons.

Furthermore, a characteristic weakness of prior tailless designs, namely, high landing speed, has been overcome by the present invention, since the entire wing can be operated up to the maximum lift-coefficient at the point of stalling, and yet the stabilizers with their ailerons are several degrees away from stalling, and the pilot still has the aircraft safety under control. This lowers the landing speed and makes for safety. Also, inasmuch as the craft will not stall, it will not spin, and a major cause of accidents is eliminated.

Another feature of the invention is the structural arrangement of the main stress members of the wing. In the invention disclosed, a transverse spar is so disposed as to carry the lift of the wing and relieves the main spars from torque loads, and the latter are subject to bending stresses only. This permits of light structural details for the wing, thereby increasing the efficiency of the craft as well as decreasing the manufacturing cost thereof.

In accordance with my invention, the stabilizing wing tip sections themselves may be provided with suitable washout or suitable taper, and, in fact, may have both washout and taper, if desired; and, while the inverted airfoil sections of the wing tips may be faired into the normal airfoil sections, I have found it preferable to have these sections separate and distinct at the trailing edge of the wing and slightly rounded off.

Other features and advantages will hereinafter appear.

In the drawings:

Figure 1 is a top plan view of the aircraft, with the stress members supporting the wing shown in broken lines.

Fig. 2 is a perspective view of one end of the wing, showing the stabilizing and controlling wing tip of the present invention.

Fig. 3 is a front view of the structure shown in Fig. 2.

Fig. 4 is a view similar to Fig. 2 showing a modified form of the invention, wherein the wing tip of inverted airfoil is provided with taper but no washout.

Fig. 5 is a front view of the structure shown in Fig. 4.

Fig. 6 is a top plan view of a modified form of the invention, in which the stabilizing and controlling wing tip has washout but no taper.

Fig. 7 is an end view of the wing tip and stabilizer shown in Fig. 6.

Fig. 8 is a sectional view, taken along line 8—8 of Fig. 2.

Fig. 9 is a similar view, showing a modified form of the invention, in which the wing tips are not provided with hinged ailerons.

Fig. 10 is a perspective view similar to Fig. 2, but showing a modified form of the invention, in which the wing tips are faired into the main wing section.

Fig. 11 is a rear view of the modified form of the invention shown in Fig. 10.

Fig. 12 is a side elevational view, showing the invention as applied to a conventional biplane.

The preferred embodiment of the present invention comprises, in the broader aspects thereof, an aircraft having a wing structure 20 formed of basically similar airfoil sections, including main stress members 21, 22 adapted to support the right and left half spans of the wing, respectively, as well as the stabilizing and control surfaces 23 arranged at the opposite extremities of the wing structure 20.

The wing structure 20, preferably, is formed from standard basically similar airfoil sections so that every rib of the wing structure is set at the same angle of incidence. The wing which is swept back may be tapered in plan, or in thickness, or both, as long as the basic airfoil contour remains the same. As will be understood, the correct angle of attack for a given airfoil section varies under different conditions of weight and air speed of the craft, so that, in the case of a wing provided with washout, only one section of the wing for any given condition of flight can meet the air at or approaching the correct angle of attack, all other sections present too great or too small an angle for maximum efficiency. The angle of incidence of the wing of the present invention, remains substantially constant along the span of the wing so that the inefficiency produced by washout in the wing is eliminated.

A small amount of washin may be present, as slightly increasing the angle of incidence toward the tip will tend to compensate for the downwash produced by the center of the wing and effective toward the tip.

The airfoil chosen for the wing structure 20 is immaterial in the present invention, and may comprise any known airfoil section desired. It is preferable, however, to select an airfoil having a substantial spar depth and a stable center of pressure disposed toward the leading edge. A suitable airfoil section which may be used to form the wing is the NACA 23012 with a center of pressure at 25% of the chord.

Referring now particularly to Fig. 1, the wing spar construction, as herein shown, may comprise left and right half span main spars 21 and 22 respectively. The spars, preferably, are so positioned as to coincide with a line extending along the centers of pressure of each rib of the wing. The centers of total lift of the left and right half spans are indicated at X and Y respectively. The aircraft is preferably designed so that the center of gravity of the entire craft lies in a vertical line passing through point G on the line XY.

In order to transmit and evenly distribute the weight of the craft to the center of lift of each half span of the wing, a transverse spar 24, coinciding with the line XY, has been provided. The ends of this spar, preferably, are rigidly and permanently secured to the main spars 21 and 22 at the point of their centers of total lift. This transverse spar carries, as will now be understood, the lift of the half spans of the wing from the centers of total lift X and Y to the center of gravity G, and thereby relieves the main spars 21 and 22 from torque loads.

Under certain conditions of construction and design, the center of gravity may be located forward of the spar XY, or the spar may be positioned further aft, in which cases the transverse spar will relieve the main spars of substantially all torque loads, although some of the load is carried to the point B by the main spars 21 and 22. The area of the wing forward of the main spars to the leading edge may be so formed of sheet metal that it will assume the torque loads caused by operation of the control members.

This arrangement of spar construction, as will be understood, is not limited to tailless aircraft, but may be used on conventional aircrafts having tapered wings.

The stabilizing and control surfaces 23, arranged at the opposite extremities of the wing structure 20, are carried and supported by the main stress members 21 and 22, and are, therefore, rigid in flight and not movable for control. In plan view, as clearly shown by Fig. 1, each stabilizing surface appears as an extension in span beyond the wing structure. This position of the stabilizers at the wing tips greatly reduces the wing tip vortices, and hence acts to reduce resistance. This effect is only partially lost by the mutual interference between the wing and the stabilizers.

The stabilizers 23, although not movable in flight, preferably may be made adjustable through a small angle about an axis coinciding with the main spar members, or about some other suitable axis, to compensate for variations in the live load of the craft as is done with adjustable stabilizers on conventional craft. This construction also permits the right stabilizer to be adjusted with respect to the left stabilizer in order to compensate for engine torque. When it is not deemed advisable, due to some particular design or construction employed, to allow the stabilizers a slight angular adjustment, engine torque may be compensated by constructing the one stabilizer at a slightly different angle than the other.

The stabilizer 23, as shown by Fig. 8, comprises an airfoil, the ribs thereof conforming to some efficient airfoil section, which is preferably identical with that afiroil used to form the wing. As clearly shown in that figure, the airfoil formed by the stabilizer 23 is disposed in an inverted position and at a negative angle of incidence with reference to the wing 20. This construction and disposition of the stabilizer provides a fore and aft dihedral necessary for longitudinal stability. The angle between the adjoining ribs of the wing and stabilizer may be as high as 30°, although the proper angular adjustment of the stabilizer with regard to the wing 20 will vary in accordance with the airfoil used to form the same, as well as the sweepback of the wing structure and the aspect ratio.

It will be seen, therefore, that the change in the angle of incidence between the stabilizers and the wing is abrupt, sharply distinguishing from prior constructions where a gradual change was effected. There may be, as shown in Figs. 10 and 11, a neutral section 25 intermediate the wing 20 and stabilizer 23 whereby the same are faired together, but, preferably, as shown by Figs. 1–8, the trailing surfaces thereof are not interconnected.

As a means of reducing resistance, the corners produced at the trailing edges of the wing and stabilizer may be rounded off as at 26, and the exposed ends of the wing and stabilizer at the joint between these two members may be faired.

There is, however, very little resistance to these stabilizers. The angular difference between the wing and the stabilizers is taken up mostly in the angle of attack of the wing, and hence is used for lift. Less than half of the angular difference is taken up as negative angle of attack of the stabilizer. Thus, for example, wind tunnel tests show that when the fore and aft dihedral was 18°, this angular difference between the wing and the stabilizer was so distributed that the angle of attack of the wing was 10.75° and the negative angle of attack of the stabilizer was 7.25°. A stabilizer area as low as 8% of the total area has been used and was adequate for its purpose. The vortices of the extreme tips of the stabilizers are reduced because of the short cord.

The stabilizer 23, although designed to normally fly at a neutral or negative angle of attack, nevertheless serve to increase the aspect ratio of the craft, and hence increase the overall aerodynamic efficiency.

Directional stability is provided, according to the present invention, by the sweepback in the wing structure and the disposition of the stabilizing and control surfaces.

The relationship between the positive angle of incidence of the wing structure and the negative angle of incidence of the stabilizer surface operates, as will be understood, as a differential frontal projected area effect between the right and the left spans of the wing structure.

The directional stability of the wing, provided for by the above described construction, is a considerable improvement over that of wings with washout, inasmuch as the constant angle of incidence throughout the span of the wing structure provides a greater frontal projected area of the wing at the outer ends thereof. This should be understood, for washout reduces the frontal projected area at the tips, and reduces the directional stability produced by the sweepback, thus necessitating the use of vertical surfaces for directional stability. It is desirable to avoid the use of vertical surfaces at the wing tips because of structural complications, and because of mutual interference between the vertical and the horizontal surfaces.

To further improve the directional stability of the wing, the stabilizers are disposed in such a manner that, in addition to the negative angle of incidence relation with respect to the wing, there is also a negative dihedral relation between the two stabilizers themselves. This can be accomplished by bending the stabilizer tips down or by rotating them about a fore and aft axis.

This negative dihedral is most conveniently produced, however, from a structural and also from an aerodynamic point of view, by disposing the stabilizer ribs adjoining the wing tips at a negative angle much greater than the negative angle of the ribs at the extreme tips of the stabilizers. This also produces, as best shown in Fig. 2, a considerable amount of washout in the very short span of each stabilizer.

The degree of washout used will vary primarily in accordance with the desired directional stability of the wing. In wings of low aspect ratio, or with little sweepback, where directional stability is less than that of wings of higher aspect ratio and considerable sweepback, the degree of washout may be correspondingly greater.

The negative setting of the stabilizers, combined with the taper and sweepback of the wing, produces a negative dihedral between the two stabilizers, even if there is no washout in the stabilizers. This is due to the fact that the rib of the airfoil section forming the stabilizer and control surface adjacent the wing is longer than the rib at the extreme tip of the former, so that the trailing edge of the stabilizer adjacent the wing is relatively higher than the trailing edge at the extremity of the tip. This design in itself produces, as will now be understood, a negative dihedral in the trailing edges of the stabilizers, although the warping described above will increase this negative dihedral of the trailing edges considerably, and increases, likewise, the negative dihedral between the surfaces of the two stabilizers. The directional stability is increased because in case of yaw or side gusts the frontal projected area of the stabilizer on the luff side is increased while the frontal projected area of the stabilizer on the lee side is decreased. The luff stabilizer also experiences an increase in angle of attack, while the lee stabilizer experiences a decrease in angle of attack. The improvement in directional stability is, therefore, a differential resistance effect between the two stabilizers, and the craft will turn toward the luff side.

There is also a favorable effect on lateral stability in that the luff stabilizer receives an increase in down load while the lee stabilizer receives a decrease in down load. The craft will, therefore, bank toward the luff side.

Washout in the stabilizer also reduces the resistance because of the decrease in the negative angle of attack as the extreme tips are approached.

To control the craft in flight, the trailing surface 27 of each stabilizer, in the preferred embodiment of the invention, is adapted to function as a control surface. To this end, the trailing surface 27 of each stabilizer is pivotally secured to the leading surface 28 thereof along the axis 29. Although the axis 29 has been illustrated as substantially parallel to the leading edge of the wing, it may be perpendicular to the line of flight or at some other desired angle.

The movable control surfaces are connected by suitable linkage to a control means in the body or cabin of the craft (not shown) in such a manner that they may be operated as ailerons or elevators.

Instead of ailerons, any of the lateral control devices available for use on conventional aircrafts may be used. The stabilizers and the entire lateral control mechanism would be inverted as in the preferred embodiment of the invention.

A body or cabin, not shown, may be suitably suspended or secured to the center of the wing by any conventional means, or the center of the wing itself may constitute the fuselage.

To mechanically propel the craft, there may be provided a suitable motor or motors, not shown, adapted to drive a conventional propeller.

It is in the controllability of the craft that the greatest improvement has been made. The two outstanding defects in the control of present aircraft are: first, that the lateral control devices introduce undesirable yaw, and, second, that the lateral control devices stall and fail to function when the wing stalls, thus making it impossible to control the craft when it is in the most dangerous attitude.

These two defects have been definitely eliminated by the present invention. The first-mentioned defect comes into existence because the ailerons are a part of the lifting surface. If the pilot wishes to bank the aircraft, he turns one aileron down and the other one up. The aileron that is down increases the lift of the tip of the wing to which it is attached, while the lift of the other wing tip is reduced. The aircraft, therefore, banks toward the side on which the aileron is turned up, but the downturned aileron also increases the drag of the wing tip to which it is attached, while the drag of the opposite tip is reduced. The aircraft, therefore, yaws toward the side of the downturned aileron.

It is most undesirable to have an aircraft bank toward one side and at the same time yaw toward the other. This is overcome in conventional craft by the use of the rudder which complicates the control of the craft and means that a person learning to fly must acquire the ability to use the proper amount of rudder at all times to properly meet the yaw produced by the ailerons.

In accordance with my invention, to bank the craft toward one side, the aileron on that side is turned up which increases the camber, and increases the negative angle of attack on that stabilizer. It also increases the drag of that same stabilizer and the craft yaws toward the same side toward which it banks. The aileron on the opposite stabilizer is turned down which decreases the camber as well as the negative angle of attack. This aileron, as will be understood, also decreases the down load and drag and, therefore, assists in banking and turning the craft toward the other side.

With properly proportioned controls, the craft will turn the proper amount for a given bank to prevent side-slipping, and will bank the proper amount on a turn to prevent skidding. The directional control of the craft is, therefore, obtained solely by operation of the control surfaces as ailerons. This removes the necessity of rudders and avoids the structural complications as well as resistance caused by the use of rudders. It will be seen, therefore, that the control of the craft of the present invention is simplified and it is thus rendered more suitable for use by unexperienced or casual pilots.

The second defect mentioned, as characteristic of the usual ailerons, is that they fail to function after the wing has stalled. This is caused by the fact that the ailerons generally are a part of the lifting surface so that when the lifting surface stalls, the ailerons stall. Efforts to avoid this defect have been made by mounting the ailerons beyond the wing tips located laterally in free air not preceded by the wing surfaces. This arrangement is effective but has the disadvantage that it is structurally difficult to avoid serious vibration.

In accordance with my invention, it is possible to efficiently use a comparatively large fore and aft dihedral between the wing and the stabilizers. Although with properly proportioned stabilizers it is impossible to stall the craft by any movements of the control surfaces, nevertheless wind squalls or other causes might throw the craft into a stalled condition. Even in such an event only the wing is stalled. The stabilizers are still far below the stalling angle, and the ailerons are still effective for control.

For example, if the fore and aft dihedral were 18°, the wing would have to be thrown to an angle of attack of 18° before the stabilizers were reduced from their negative flying angle down to an angle of attack of 0 degrees. At this point, the wing is near the stall, but the stabilizers with their ailerons are close to the middle of their range of operating angles, and the ailerons are certain to be effective. The stabilizers, being constructed integral with the wing, the problem of vibration is avoided.

Furthermore, this arrangement makes it possible to overcome a weakness that has been characteristic of preceding tailless designs, namely, low speed range. With washout in the wing, the center section would stall while the rest of the wing was considerably below the maximum lift. This action, as will be understood, raised the landing speed. Likewise at the other end of the speed range only part of the wing could be brought to the proper angle for high speed conditions, and the maximum speed was reduced.

In a craft constructed in accordance with my invention, the entire wing can be operated up to the maximum lift coefficient, at the point of stalling, and yet the stabilizers with their ailerons are several degrees away from stalling; and the pilot still has the aircraft safely under control. This lowers the landing speed and makes for safety. Also, inasmuch as the craft will not stall, it will not spin, and a major cause of accidents has been directly eliminated.

The tips 23 normally carry a down load differing from the tips of conventional crafts which are lifting surfaces. When a conventional craft goes into a spin, there is a tendency for the outside tip to increase its lift due to its increased speed. The tip toward the center of the spin is moving slower and the lift is decreased so that the craft has a tendency to be held in the spin. When the tips, as in the present invention, carry a down load, the reverse is true. In making a turn, the outside tip due to the increase in speed receives a greater down load instead of a greater lift and the inside tip receives a lesser down load causing the craft to bank away from the turn instead of into it.

A craft equipped with the control and stabilizing surfaces of the present invention can only be held in a turn by movement of the controls which would lower the flap on the outside tip, and, at the same time, raise the flap on the inside tip. The natural spinning tendency of the wing itself is overcome by the negative tips which are operating on a longer radius than the lifting parts of the wing.

For high speed conditions, the entire wing can be brought to the proper angle, and to do so the ailerons are lowered which reduces their resistance. The elimination of rudders also improves the top speed.

The lift of the wing can be increased, as well as the speed range of the craft, by hinging suitably cambered flaps 30 on an axis adjacent the trailing edge of the wing. The flaps 30 preferably, as herein shown, may comprise full span flaps although quarterspan or semispan flaps can be used. The flaps also, as will be understood, tend to decrease landing speed.

In a modified form of the invention, as shown in Fig. 9, the stabilizers are formed as a unit and the movable control surface has been dispensed with. In this modification, the entire stabilizer member may be pivotally carried by a support secured to the wing. The axis of rotation of the stabilizer may coincide with a continuation of the main spar members or may be at right angles to the fore and aft axis of the craft. The stabilizer area, as shown in this modification, may be similar to a floating aileron except that if an unstable airfoil section is used for the wing it will be necessary to rig these stabilizers at a negative angle to provide a fore and aft dihedral necessary to stabilize the wing.

In cases where economy and convenience of manufacture are paramount, the novel features described above may be incorporated in a wing having leading and trailing edges parallel to each other as shown in Fig. 6. The advantage of this form is that all wing ribs, leading edge formers and other structural details may be identical, which is very desirable for mass production.

It will, of course, be understood that the stabilizer elements may be used with tapered wings, or with wings in which the leading edge is parallel with the trailing edge. The stabilizer elements may be used on biplanes for either the upper wing or the lower wing, or both, or may be used on triplanes or other multiple combinations.

One advantageous combination is with sweptback biplane wings in which one wing is staggered ahead of the other, and the stabilizer elements are used on the rearward wing.

The stabilizer surface may be used also on the conventional type of aircraft which has an empennage. In this case, the stabilizer surfaces take the place of ailerons for lateral control, but are not used as elevators for longitudinal control. The directional effect still exists, and a rudder may or may not be mounted on the empennage.

The abrupt change in angle of incidence may be the only stabilizer element used, in which case the wing portion in front of the ailerons is set abruptly at a lower angle of incidence than the rest of the wing. This differs from washout only in that the change in angle is abrupt instead of gradual. It serves the purpose that the tip portions with the ailerons still function after the rest of the wing has stalled.

The entire stabilizer and control surface, as described hereinbefore, as shown by Fig. 12, may be added laterally to each wing tip.

This serves to eliminate the two defects of lateral control as explained previously. The controls still function after the wing stalls, and the operation of the ailerons for banking produces yaw in the same direction.

The design and structural details of the wing and control surfaces readily lends itself for use in connection with gliders as the craft will be light in weight and easily controlled. The stability of the wing also enhances the value of a motorless craft constructed in accordance with the principles herein disclosed.

A very stable toy or model craft can also be obtained through the use of the invention, for even if the model is improperly balanced with the center of gravity so far back as to produce stalling, it will not roll off side into a spin. This is, of course, highly desirable in a model craft as the model in flight is incapable of control other than that due solely to the arrangement and disposition of its fixed parts.

Variations and modifications may be made within the scope of this invention and portions of the improvements may be used without others.

I claim:

1. In an aircraft, a main supporting wing having the extreme tip portions thereof oppositely cambered relative to the remainder of the wing, the change in camber between said wing and tip portions being abrupt, the leading edge of said extreme tip portions coinciding with oppositely projected lines coinciding with the leading edge of said main supporting wing.

2. In an aircraft, a main supporting wing having a positive lifting effect substantially throughout the length thereof; and airfoil surfaces comprising tip members for the wing having cambered surfaces opposite in sign relative to that of the wing, each tip member providing an abrupt change in camber between the wing and the tip member, the leading edge of said tip members being structurally united with the adjacent leading edge surfaces of the main supporting wing and coinciding with lines oppositely projected of the longitudinal axis of the aircraft and coinciding with the leading edge of the main supporting edge.

3. In an aircraft, a main supporting wing having a positive lifting effect substantially throughout the length thereof; and airfoil surfaces comprising tip members for the wing having a normal negative angle of incidence, each tip member being so disposed with respect to said wing as to provide an abrupt change in the lifting effects between the wing and the tip member, the leading edge of each tip member coinciding with oppositely projected lines coinciding with the leading edge of the main supporting wing, said tip members being at least in part pivotally mounted for movement in the same or opposite directions for selective control of the craft.

4. In an aircraft, a positively cambered main supporting surface having a substantially constant positive angle of incidence; and negatively cambered tip members having a negative angle of incidence, the leading edge of said tip members being a continuation of the leading edge of said main supporting surface and lying in substantially the same horizontal plane.

5. In an aircraft, a main supporting surface having the tip portions thereof cambered downwardly and the remainder of the wing cambered upwardly, the leading edge of the tip portions being a continuation of the leading edge of the main supporting surface and lying in substantially the same horizontal plane.

6. In an aircraft, a main supporting surface having the tip portions thereof cambered downwardly and the remainder of the wing cambered upwardly, said tip portions being pivotally mounted, the leading edge of said tip portions coinciding with a line formed by oppositely projecting the leading edge of said main supporting surface.

7. In an aircraft, a main supporting surface having the tip portions thereof cambered downwardly and the remainder of the wing cambered upwardly, the trailing portion of said tip portions being pivotally mounted, the leading edge of said tip portions being structurally united with the adjacent leading edge surfaces of the main supporting surface and coinciding with lines oppositely projected of the longitudinal axis of the aircraft and coinciding with the leading edge of the machine supporting edge.

8. In an aircraft, a main supporting surface having a positive lifting effect substantially throughout the length thereof; and airfoil surfaces disposed at opposite ends of said supporting surface, said airfoil surfaces having normal negative lifting effects with respect to the supporting surface and having washout such as to produce a negative angle of attack which decreases in value from a point inboard toward the outboard end thereof.

9. In an aircraft, a main supporting wing having a positive lifting effect substantially throughout the length thereof; and airfoil surfaces comprising tip members for said wing, the leading edge of each airfoil surface being a continuation of the leading edge of said wing and lying in the same horizontal plane, said tip members having normal negative lifting effects with respect to the wing and so constructed and arranged as to provide an abrupt change in the lifting effects between said airfoil surfaces and said wing.

10. In an aircraft, a body; right and left wing sections extending outwardly and rearwardly from said body forming a main supporting surface; the outer tip portion of each wing having an inverted airfoil contour, at least a part of each tip portion being pivotally mounted for operation as a control surface; a main spar in each of said sections extending outwardly and rearwardly in substantial parallelism with the respective leading edges thereof and serving to support said tip portions; and an additional spar extending substantially at right angles to the longitudinal axis of the body, the right and left ends of said spar being attached respectively to said right and left main spars at points inboard of said tip portions.

11. In an aircraft having a body; right and left wing sections extending outwardly and rearwardly from said body forming a main supporting surface therefor; a main spar in each of said sections extending outwardly and rearwardly in substantial parallelism with the respective leading edges thereof; and an additional spar extending transversely of the fore and aft axis of the aircraft and rigidly connected at its ends respectively to the right and left main spars and passing adjacent to a vertical line through the center of gravity of the aircraft.

12. In an aircraft having a swept back wing comprising basically similar airfoil sections, said wing having a positive lifting effect substantially throughout the length thereof; basically similar airfoil surfaces comprising tip members for the wing having a normal negative angle of incidence; a wing spar extending substantially from tip to tip generally parallel with the leading edge of the wing and serving to support said tip members; and an additional spar extending substantially at right angles to the longitudinal axis of the body, the right and left ends of said spar being attached respectively to the right and left wing portions of said first-named spar and passing adjacent to a vertical line passing through the center of gravity of the aircraft.

13. In an aircraft having a swept back wing; a wing spar extending substantially from tip to tip generally parallel with the leading edge of the wing; and a second spar rigidly interconnecting the right and left wing portions of said first spar and passing adjacent to a vertical line passing through the center of gravity of the aircraft.

14. In an aircraft, a main supporting surface having the tip portions thereof cambered downwardly and the remainder of the wing cambered upwardly, the tip portions of said surface being normally set at a negative angle of incidence, said negative angle of incidence decreasing in value from a point inboard toward the outboard end of said tip portions.

15. In an aircraft, a positively cambered main supporting wing having a substantially constant angle of incidence throughout the length thereof; and negatively cambered airfoil surfaces having normal negative lifting effects mounted on the opposite ends of said wing, at least a part of said airfoil surfaces being pivotally mounted for operation as a control surface, the leading edge of said surfaces coinciding with a line formed by horizontally projecting in opposite directions the leading edge of said main supporting wing.

16. In an aircraft, a main supporting wing comprising basically similar positively cambered airfoil sections the outer tip portions of said wing comprising similar negatively cambered airfoil sections having a negative angle of incidence, the leading edge of each tip portion being a continuation of the leading edge of adjacent portions of the main supporting wing and in the same horizontal plane.

17. In an aircraft, a main supporting surface having a positive lifting effect substantially throughout the length thereof, said surface comprising basically similar positively cambered airfoil sections; and airfoil surfaces comprising tip members for said main supporting surface having normal negative lifting effects with respect to said supporting surface, said airfoil surface comprising basically similar airfoil sections substantially like the airfoil sections of said supporting surface and having a negative camber, at least a part of the last-named surfaces being pivotally mounted for operation as a control surface the leading edges thereof being coincident with a line oppositely projecting the leading edge of said main supporting surface.

18. In an aircraft, a main supporting wing surface having the tip portions thereof cambered downwardly and the remainder of the wing surface cambered upwardly, said tip portions being normally disposed at an angle of incidence opposite in sign to that of the main supporting wing surface the leading edges thereof being coincident with a line oppositely projecting the leading edge of said main supporting surface.

19. In an aircraft, a body; right and left wing sections extending outwardly and rearwardly of said body; a main spar in each of said sections extending outwardly and rearwardly in substantial parallelism with the respective leading edges thereof; and an additional spar extending substantially at right angles to the longitudinal axis of the craft and rigidly interconnecting the two main spars, said last-named spar lying within the wing along a line behind the vertical line which passes through the center of gravity of the craft.

20. In an aircraft, a main supporting wing having a positive lifting effect substantially throughout the length thereof; and inverted airfoil surfaces comprising tip members for the wing having a negative angle of incidence, the leading edge of each tip portion being substantially a continuing extension of the leading edge of the wing and structurally united therewith, the trailing edge of each tip portion being abruptly offset with regard to the trailing edge of the wing.

21. In an aircraft, a main supporting wing having a positive lifting effect substantially throughout the length thereof; and inverted airfoil surfaces comprising tip members for the wing having a negative angle of incidence, the leading edge of each tip portion being substantially a straight line continuing extension of the leading edge of the wing, the tip members being pivotally mounted for operation as a control surface.

22. In an aircraft, a main supporting wing having a positive lifting effect substantially throughout the length thereof; inverted airfoil surfaces comprising tip members for the wing having a negative angle of incidence, the leading edge of each tip portion being substantially an extension of the leading edge of the wing; and the trailing edge of each tip portion lying above the extended line of the trailing edge of the wing, the trailing portion of each tip member being pivotally mounted for operation as a control surface.

23. An aircraft having a swept back wing comprising basically similar airfoil sections, said wing having a positive lifting effect substantially throughout the length thereof, a wing spar extending substantially from tip to tip generally parallel with the leading edge of the wing and coinciding with a line joining the centers of pressure of each section; and an additional spar extending substantially at right angles to the longitudinal angles of the body, the right and left ends of said spar being attached respectively to the right anid left wing portions of said first-named spar at a point coinciding with the centers of total lift of said right and left wing portions.

24. An airfoil, the tip members of which have a break in the control edge so that the controlling edge of the tip portion is out of line with the extension of the controlling edge of the remainder of the airfoil, the tip portion having a camber opposite to the camber in the remainder of the airfoil.

STEPHEN W. THOMPSON.